United States Patent [19]

Rashid

[11] Patent Number: 5,077,485
[45] Date of Patent: Dec. 31, 1991

[54] VOLTAGE REGULATOR LOAD DIVISION USING REAL AND REACTIVE GENERATOR OUTPUT POWER COMPONENTS TO CONTROL THE EXCITER

[75] Inventor: Abdul Rashid, Rockford, Ill.

[73] Assignee: Sundstrand Corporation, Rockford, Ill.

[21] Appl. No.: 431,900

[22] Filed: Nov. 6, 1989

[51] Int. Cl.$^5$ .......................... H02J 3/06; H02P 9/10
[52] U.S. Cl. ........................................ 307/84; 307/57; 322/25
[58] Field of Search ................... 307/57, 85, 87, 20, 307/24, 78, 83, 84; 322/25

[56] References Cited

U.S. PATENT DOCUMENTS

| | | | |
|---|---|---|---|
| 4,135,128 | 1/1979 | Kelley, Jr. | 361/63 |
| 4,164,661 | 8/1979 | Hucker et al. | 307/57 |
| 4,728,806 | 3/1988 | Baker et al. | 307/43 |
| 4,905,134 | 2/1990 | Recker et al. | 307/66 |

Primary Examiner—A. D. Pellinen
Assistant Examiner—Richard Elms
Attorney, Agent, or Firm—Wood, Phillips, Mason, Recktenwald & VanSanten

[57] ABSTRACT

The problem for distributing load equally between multiple generators (34) in multi-channel generating systems is resolved using a voltage regulator (60) including a reactive load division loop (84) and real load division loop (86). The voltage regulator (60) controls generator excitation responsive to sensed voltage. The reactive load division loop and real load division loop modify the voltage regulator output to divide loading equally between each generator.

16 Claims, 4 Drawing Sheets

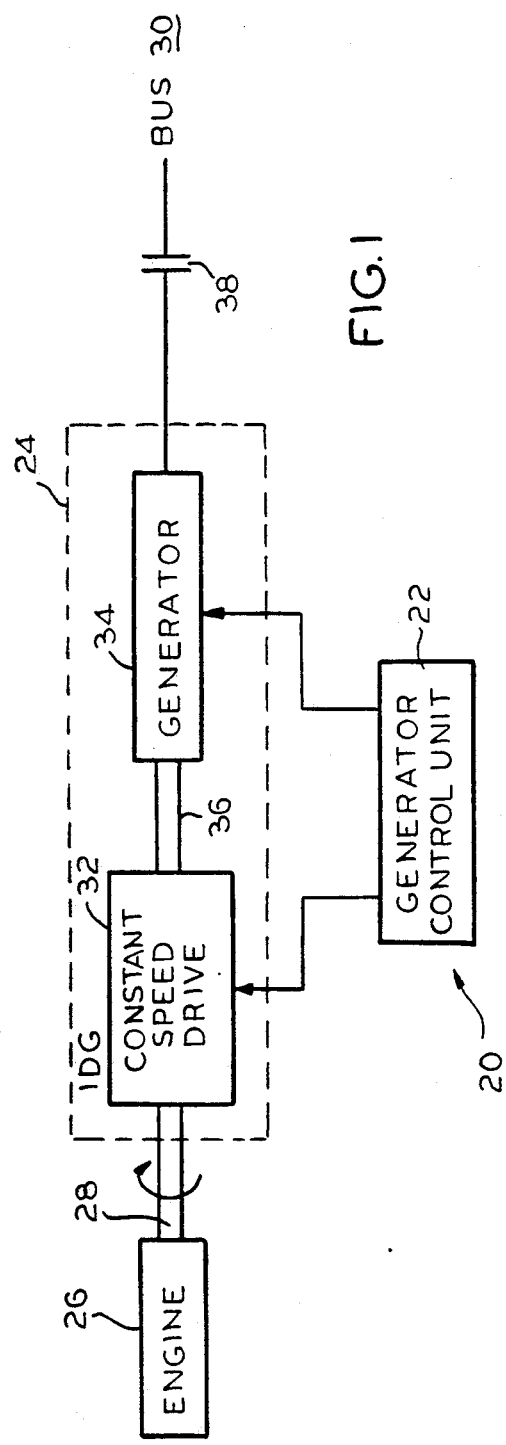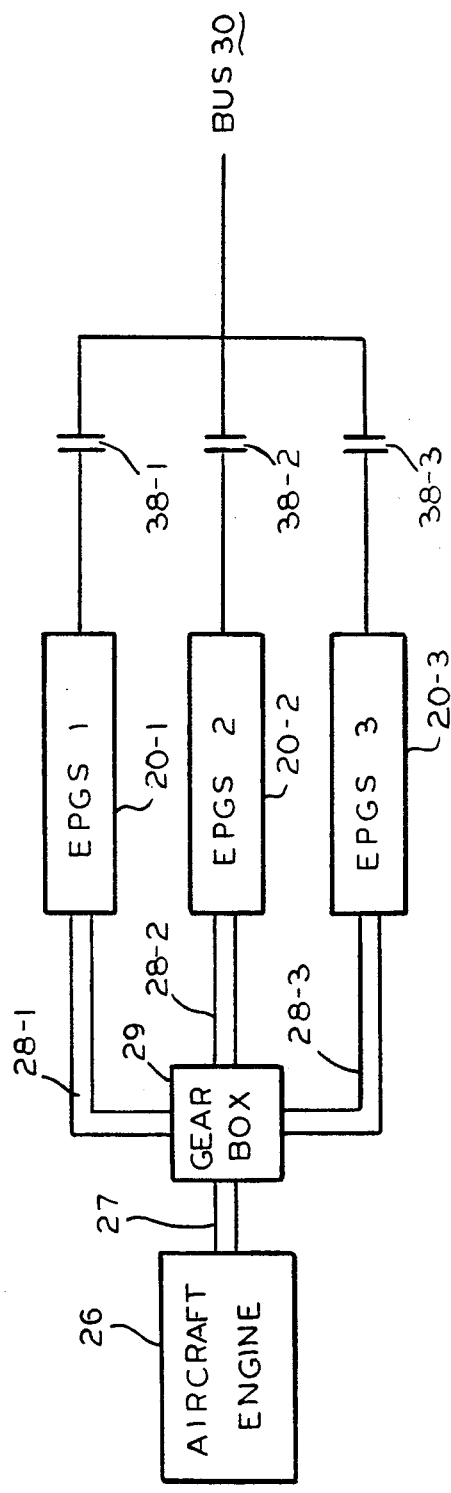

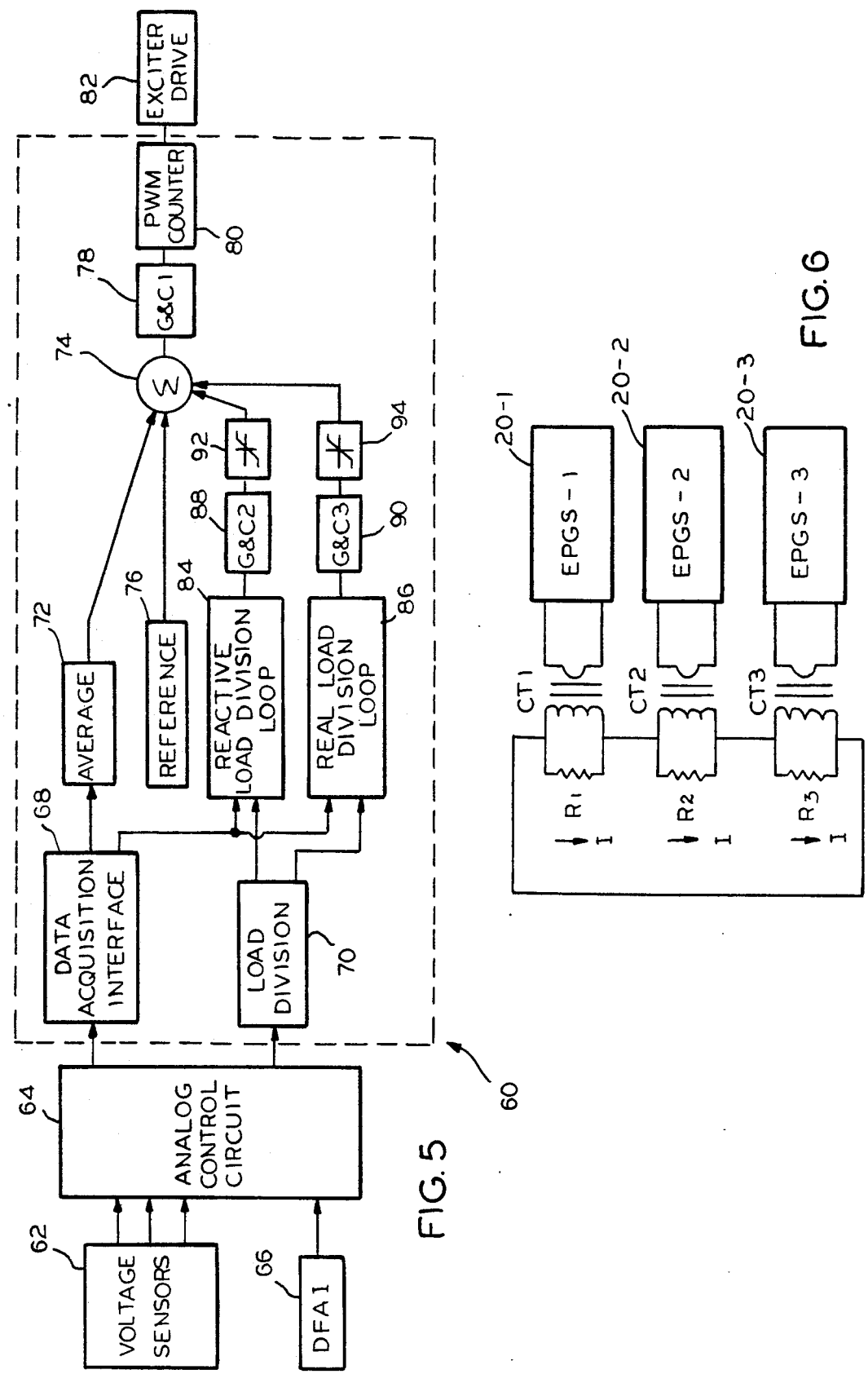

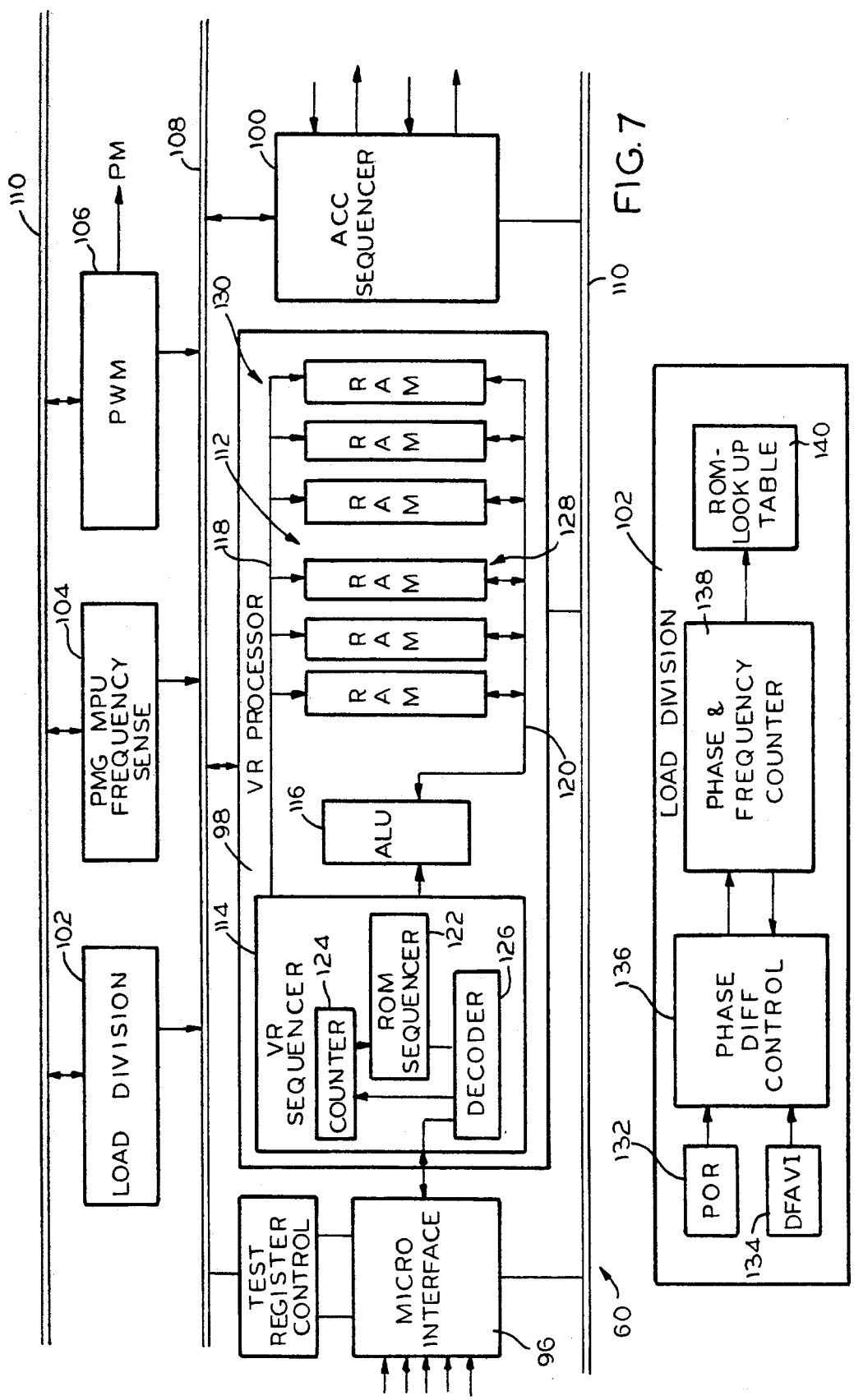

VOLTAGE REGULATOR LOAD DIVISION USING REAL AND REACTIVE GENERATOR OUTPUT POWER COMPONENTS TO CONTROL THE EXCITER

FIELD OF THE INVENTION

This invention relates to electrical power generating systems and, more particularly, to an improved load sharing control in a multi-channel system.

BACKGROUND OF THE INVENTION

A conventional electrical power generating system (EPGS) for an aircraft, in one known form, comprises an integrated drive generator including a constant speed drive and a generator. The integrated drive generator receives mechanical power at varying speed from an aircraft engine and delivers electrical power at constant frequency. The constant speed drive includes a speed control assembly and receives mechanical input power at varying speed from the aircraft engine and delivers power from its output shaft at constant speed. The generator comprises a salient pole machine with a rotating field which is excited through an exciter powered by a permanent magnet generator (PMG) through a voltage regulator. Such conventional systems use a generator control unit (GCU) to provide voltage regulation and speed regulation. Specifically, a voltage regulator provides excitation power to an exciter at levels which provide constant system voltage at the point of regulation. A speed control controls trimming of a servo valve to maintain generator speed, and thus frequency, to be constant.

Prior generator control units used either analog or digital circuits, with the choice being based on factors such as weight, size, cost and complexity of control logic. In analog systems both integrated circuits and discrete components are used and some signals are converted to digital form. However, signals are combined and perform their required functions using analog type control. Such system products incorporate standard, off-the-shelf components. Implementing a system which has the complexity of a generator control unit with standard product technology requires the use of many hundreds of electronic devices even for a relatively simple application, such as for a single channel EPGS. Each device adds additional weight to the product, including indirect weight in the form of additional circuit board area and housing needed to support the inclusion of each device. Since commercial and military aircraft are the intended end use of such products, it is desirable to minimize weight.

Further, analog circuits tend to be environmentally sensitive. For example, parameter drift results owing to changes in temperature and humidity, as well as age of the devices. Further, with analog technology the control cannot be easily changed. Instead, circuit components must be modified resulting in custom design for each different application.

In digital control systems, conversely, all signals are converted to digital form and certain control and protection functions are controlled by a microprocessor. As such, the control system is inherently more flexible in implementing different control schemes. In a digital control system the control unit contains a microprocessor and associated software and continuously and sequentially checks for proper system conditions and for control commands, and performs the programmed sequence of instructions. However, the actual flexibility available with such a digital system is limited due to limitations in processing time available in the microprocessor for performing both control and protection functions. In fact, known GCU systems employ an analog control for implementing the voltage regulator functions. As a result, it is necessary to provide circuit components associated with voltage regulation.

Additional problems result in the design of generator control units. In each application it is necessary to develop a cost effective, lightweight solution. Therefore, the designer must start from "scratch" in designing a generator control unit for each new application. This results in each generator control unit being custom made and therefore more expensive.

A typical multi-channel electrical power generating system includes two or more generators operating in parallel. Advantageously, the loading is shared equally by each generator. Specifically, field excitation has a direct effect on the reactive load supplied by each machine and some effect on the relative division of real load among the generators. A generator which is underexcited carries less than its share of lagging reactive system load. The transfer of its reactive load to other machines will increase their heating. An underexcited machine also has less than normal synchronizing torque and is therefore more likely to pull out of synchronism on a heavy load transient.

Known prior such generating systems have used load division controls responsive to current transformer loops which sense the direction and magnitude of deviation of each generator load from the average load. The output of any one current transformer is the difference between the current in that generator and the average current of the paralleled generators. The magnitude of the current indicates how much the output of the generator has deviated from its required share of the load, and the phase angle indicates whether the generator is carrying more or less than its share of the load. Such load division controls have employed real load division by sensing the DC output of a real load demodulator to bias the signal to the integrated drive generator speed control in order to maintain real load division. A reactive load division demodulator operates similarly, except that the phase voltage is shifted by 90° and is summed with the voltage regulator error to trim the generator excitation current to ensure equal reactive load division.

Such a prior control scheme does not compensate for effect on the relative division of real load caused by changes in field excitation of one machine.

The present invention is directed to overcoming one or more of the problems discussed above.

SUMMARY OF THE INVENTION

In accordance with the invention, a generator control unit trims generator excitation in response to the real and reactive components of output current deviation to stabilize performance.

Broadly, there is disclosed herein a generator control for each channel in a multi-channel generating system, each channel having a main generator and an exciter providing field current to the main generator. The generator control comprises voltage sensing means for sensing generator output voltage and voltage reference means for developing a setpoint representing a desired generator output voltage. A voltage control means is responsive to the voltage sensing means and the voltage reference means for developing a controlling output to the exciter means to regulate the output of the main generator. Current sensing means are provided for sensing generator output current for the particular channel relative to the other channels. Load division means are responsive to the current sensing means and the voltage sensing means for determining real and reactive components of the generator output power, and means are responsive to the real and reactive components of generator output power for modifying the controlling output to divide loading equally between each channel.

It is a feature of the invention that the current sensing means include means for sensing a difference between generator output current for the particular channel relative to average generator output current of all of the channels.

It is another feature of the invention that the determining means senses a phase difference between the generator output current and the generator output voltage.

It is a further feature of the invention that the determining means includes means for determining the real component responsive to cosine of the phase difference and means for determining the reactive components responsive to sine of the phase difference.

It is yet another feature of the invention that the modifying means includes means for limiting an amount which the controlling output is modified.

In accordance with another aspect of the invention there is disclosed herein a generator control unit for each channel in a multi-channel generating system. Each channel has a generator including a main generator which develops output power, an exciter providing field current to a field winding of the main generator, and a permanent magnet generator for providing field current to a field winding and the exciter. The exciter field current is controlled in accordance with a control signal which controls the exciter to regulate at the output of the main generator. The generator control unit includes voltage sensing means for sensing generator output voltage and current sensing means for sensing generator output current for the particular channel relative to the other channels. A processor is responsive to the sensed voltage for establishing the control signal in accordance with a programmed control algorithm and including a load division algorithm responsive to the sensed current for modifying the control signal in accordance with real and reactive components of sensed current to divide load between each generator. A programmable memory is operatively connected with the processor and stores data used by the load division algorithm to determine the real and reactive components.

More specifically, electrical power generating systems such as are used in an aircraft often employ plural generators to provide power to common loads. Each generator includes a permanent magnet generator, an exciter and a main generator. The PMG develops power which is regulated by a voltage regulator which is part of a generator control unit. The voltage regulator controls excitation to compensate for changes in load condition to maintain constant output voltage.

A load division control algorithm in the voltage regulator uses two separate control loops, namely, a reactive load division loop and a real load division loop. Each loop includes two inputs. The first input is the point of regulation voltage waveform, while the second is a waveform representing the difference from average current for the particular generator. The phase difference control measures the phase difference between the POR voltage and the difference from average current. A ROM lookup table is used to determine the sine of the phase difference, representing reactive power, and the cosine of the phase difference, representing real power. The lookup table values are multiplied with the magnitude of the difference from average current and are applied to a programmable limit curve and gain and compensation function for developing real and reactive load bias values to be summed with the output of an average voltage control loop to compensate for imbalance and load sharing.

Further features and advantages of the invention will readily be apparent from the specification and from the drawings.

BRIEF DESCRIPTION OF THE DRAWINGS

FIG. 1 is a simplified block diagram for an aircraft electrical power generator system (EPGS) including a voltage regulator implementing a load division control according to the invention;

FIG. 2 is a simplified block diagram for the EPGS of FIG. 1 used in a multi-channel power generating system;

FIG. 5 is a detailed functional block diagram of the control loops implemented in the voltage regulator of FIG. 4;

FIG. 6 is a schematic diagram illustrating a load division current transformer loop;

FIG. 7 is a hardware block diagram of the voltage regulator of FIG. 4; and

FIG. 8 is a detailed hardware block diagram of a load division circuit for the voltage regulator of FIG. 7.

DETAILED DESCRIPTION OF THE INVENTION

Figure 3:
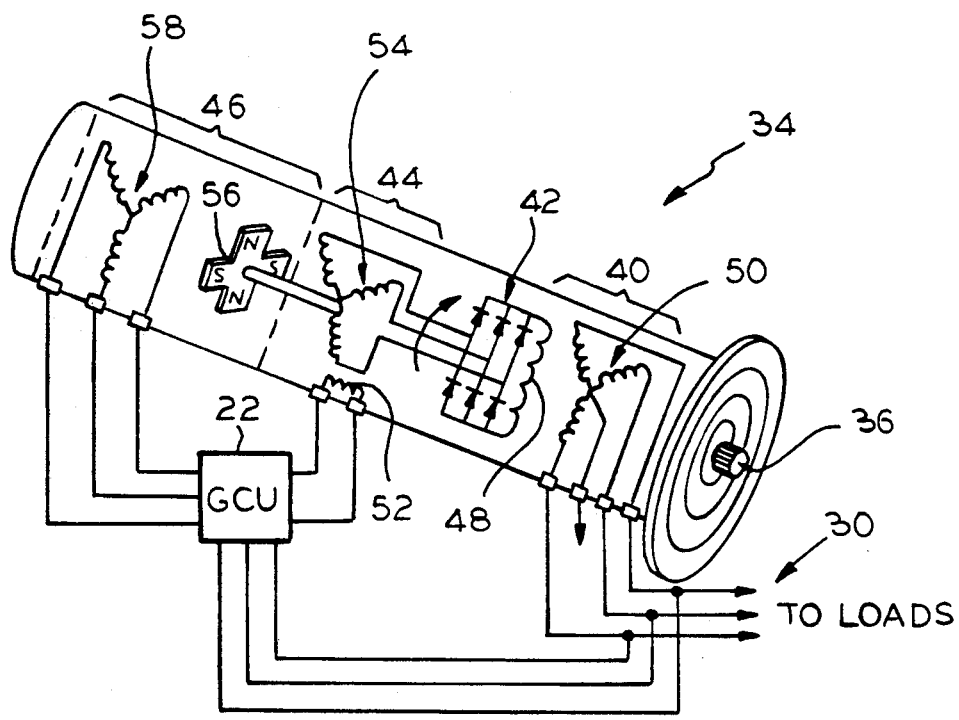
FIG. 3 is a combined schematic and perspective view of an EPGS generator.

With reference to FIG. 1, a block diagram representation illustrates an electrical power generating system (EPGS) 20 including a generator control unit (GCU) 22 according to the invention. In the illustrated embodiment, the EPGS 20 is used in an aircraft providing power to aircraft loads. The GCU 22 could be used in connection with various other generating systems, as is obvious to those skilled in the art.

In addition to the GCU 22, the EPGS 20 includes an integrated drive generator (IDG) 24. The IDG 24 receives mechanical power at varying speed from an aircraft engine 26 through a rotating shaft 28 and delivers electric power at constant frequency at a power bus 30.

With reference also to FIG. 2, the EPGS 20 is illustrated in connection with a multi-channel power generating system including three parallel EPGS's 20-1, 20-2 and 20-3, each of which is identical in construction. Specifically, each of the three EPGS's 20-1, 20-2 and 20-3 are connected through associated input shafts 28-1, 28-2 and 28-3, respectively, and a gear box 29 to an engine output shaft 27 connected to the aircraft engine 26. Each EPGS 20 develops output power to supply the bus 30 through associated contactors 38-1, 38-2 and 38-3. In accordance with the invention, it is desired that the load sharing to the bus 30 be distributed equally among the three EPGS's 20-1, 20-2 and 20-3, as discussed below.

Since each of the EPGS's 20-1, 20-2 and 20-3 is identical in construction, only one is described specifically herein and is referred to without the suffix comprising the generator number.

The IDG 24 includes a constant speed drive 32 and a generator 34. The constant speed drive 32 receives mechanical input power from the shaft 28 at varying speed and delivers mechanical power from its output shaft 36 at constant speed. The generator 34 is driven by the shaft 36 and develops electrical output power through suitable fault protection circuits represented by a generator relay or contactor, illustrated schematically at 38, to the bus 30.

With reference also to FIG. 3, the generator 34 includes a main generator 40, a rotating rectifier bridge assembly 42, an exciter 44 and a permanent magnet generator (PMG) 46. Each of the main generator 40, exciter 44 and PMG 46 includes a rotor driven by the constant speed drive 32 via the common shaft 36. As is well known, the generator 34 may be mounted in a common housing with the constant speed drive 32 and, more specifically, may be mounted in line or side-by-side, as is necessary or desired.

The main generator 40 is a salient pole machine having a rotating field producing output power at a frequency of 400 Hz. Particularly, a four pole machine is used at 12,000 rpm, while a two pole machine is used at 24,000 rpm. The main generator 40 includes a rotor carrying a DC field winding 48, and a stator carrying a polyphase AC armature winding 50.

The exciter 44 is a multi-pole salient pole machine which provides excitation to the main generator 40. The exciter 44 includes a stator carrying a DC field winding 52 and a rotor carrying a polyphase AC armature winding 54. The armature winding 54 is connected through the rotating rectifier bridge assembly 42 to the main armature DC field winding 48.

The PMG 46 is a pilot generator in which field flux is provided by a permanent magnet 56 mounted on a rotor driven by the shaft 36 and which is magnetically coupled with a polyphase stator armature winding 58.

The PMG stator winding 58 is connected through the GCU 22 to the exciter DC field winding 52. Although not specifically illustrated herein, the GCU 22 includes a rectifier which converts the polyphase AC power from the PMG stator winding 58 to DC power which is regulated to drive the exciter DC field winding 52.

As is conventional in brushless power generators, rotation of the shaft 36 by the aircraft engine 26 through the constant speed drive 32 and a gearbox, not shown, results in generation of a polyphase voltage in the exciter armature windings 54 as they traverse the magnetic field set up by the exciter DC field winding 52. This polyphase voltage is rectified by the rotating rectifier bridge assembly 42, and the rectified power is coupled to the main generator field winding 48. The current in the main generator field winding 48 and the rotation of the shaft 36 sets up a rotating magnetic field in space occupied by the main generator stator windings 50. The stator windings 50 develop polyphase output power at constant frequency which is delivered to the AC bus 30 for powering loads.

Figure 4:
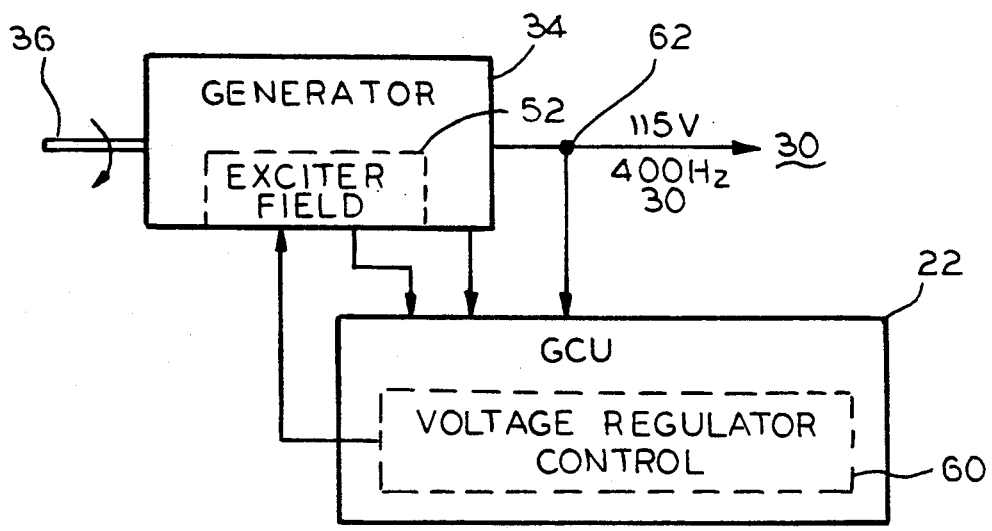
FIG. 4 is a simplified block diagram of a voltage regulator control loop.

With reference also to FIG. 4, a block diagram illustrates a control loop for regulating excitation to the exciter DC field winding 52. Specifically, a voltage regulator control 60 in the GCU 22 controls generator output voltage at a point of regulation (POR) using sensors 62 for sensing system conditions, such as voltage and current. The GCU 22 regulates the energy coupled from the exciter field winding 52 to the exciter armature winding 54 and ultimately to the main generator 40.

With reference to FIG. 5, a block diagram illustrates the control loops implemented by the voltage regulator control 60, see FIG. 4. The generators three phase voltage signals are sensed at the point of regulation by sensors 62, see FIG. 4, and are conditioned by an analog control circuit 64. The analog control circuit 64 also receives a signal from a sensor 66 representing the difference between current of the particular generator and the average current of the three paralleled EPG's 20-1, 20-2 and 20-3, see FIG. 2. Particularly, and with reference to FIG. 6, the sensor 66 may comprise a load division current transformer loop composed of a series string of current transformer secondaries CT1-CT3 and burden resistors R1-R3, with each current transformer CT1-CT3 being on the same phase of its respective generator. As is well known, the output of any one current transformer is the difference between the current in that generator and the average current of the paralleled generators. The magnitude of the current indicates how much the output of the generator has deviated from its required share of the load, and the phase angle indicates whether the generator is carrying more or less than its share of the load. Since the output of the current transformer represents total current, real and reactive components thereof must be derived for load sharing control.

The generator's three phase voltage signals and difference from average current are sampled by the voltage regulator 60 via a data acquisition interface 68. This signal represents the RMS voltage level of the signals. In addition, the analog control circuit includes zero crossing detector circuits (not shown) which develop square wave signals, representing the POR voltage signal for one of the three phases and the difference from average current signal, which are applied to a load division control 70.

The three phase voltage signals obtained by the data acquisition interface 68 are processed by an average voltage loop 72 which provides a calculated average of the three voltages and applies the same to a summer 74. The summer 74 also receives a reference value from a reference block 76 representing a desired point of regulation voltage level. The summer 74 calculates an error representing the difference between the POR voltage input and the POR voltage reference. The error is filtered by a gain and compensation function block 78 in such as a way as to allow for stable operation, yet have suitably fast transient response over all operating conditions. The filtered error is applied to a pulse width modulation (PWM) counter 80 to alter the PWM duty cycle of an exciter field drive switching circuit 82 which in turn varies the field current to the exciter field winding 52, see FIG. 4, to vary generator output power.

As described more specifically below, the load division block 70 determines the phase angle between the POR voltage and the difference from average current and develops signals representing the sine and cosine thereof which are applied to respective reactive load division and real load division loops 84 and 86. The load division loops 84 and 86 also receive a signal representing amplitude of the difference from average current from the data acquisition interface 68. The reactive load division loop multiplies the difference from average current amplitude by the sine of the phase angle to develop an error signal representing the reactive component of load division error which is applied to a second gain and compensation function block 88. The real load division loop multiplies the difference from average current amplitude by the cosine of the phase angle to produce an error signal representing real load division error which is applied to a third gain and compensation function block 90. The filtered errors from the blocks 88 and 90 are applied through respective limit functions 92 and 94 to the summer 74. Specifically, the filtered errors are compared to a programmed ramp function having saturation limits for developing bias signals to the average voltage error. Specifically, the reactive load division loop 84 trims the generator excitation current to ensure equal reactive load division, while the real load division loop 86 trims the generator excitation current to ensure equal real load division.

With reference to FIG. 7, a generalized block diagram illustrates the architecture of a circuit for the voltage regulator 60. In the illustrated embodiment, the voltage regulator 60 uses custom very large scale integration (VLSI) technology to reduce size, weight, life cycle costs and improve reliability. Specifically, owing to the use of VLSI technology, the entire GCU 22 can be built utilizing a relatively small number of parts to provide reduced weight and having signal level circuits that are general purpose so that they can be employed in all GCU voltage regulator applications without hardware redesign. The voltage regulator circuit 60 comprises a custom digital chip having 1.25 micron technology using 74K transistors and a 10 MHz clock signal.

The principal circuit elements of the voltage regulator 60 comprise a microprocessor interface circuit 96, a processor 98, an analog control circuit (ACC) sequencer circuit 100, a load division circuit 102, a permanent magnet generator and magnetic pickup unit sense circuit 104, and a pulse width modulation drive circuit 106 which communicate on a data bus 108 and an address bus 110 which may be connected to an external microprocessor control (not shown).

The microprocessor interface circuit 96 is an interface module that controls that data transfer between a system microprocessor and the voltage regulator 60. Programmable and readable registers and RAM memory 112 within the voltage regulator processor are mapped to the memory address interface of the microprocessor for chip initialization, BIT function, debug and test operations. The microprocessor interface operations to the voltage regulator 60 are primarily performed during chip initialization which takes place immediately after system reset.

The voltage regulator processor 98 interfaces with all of the other circuits in the voltage regulator 60 and performs all calculations and temporary storage of internal variables. The components of the processor 98 are the memory circuits 112, a sequencer circuit 114 and an arithmetic logic unit (ALU) 116. The sequencer 114, ALU 116 and memory circuits 112 communicate via an internal address bus 118 and databus 120.

The sequencer 114 controls the operation of the loop functions illustrated in FIG. 5. Any of the loop functions, namely, reactive load division 84, real load division 86, POR average and the main loop can be accessed by the sequencer 114. Specifically, the sequencer 114 sends out a request, the loop function then performs its task, and returns an acknowledge flag for completion. The sequencer's algorithm is centered around the POR average voltage loop 72, discussed above.

The sequencer 134 includes a ROM based sequencer 122 controlled by a program counter 124. The ROM based sequencer 122 implements the control loops and filter control. A decoder 126 receives information from the ROM based sequencer 122, and the microprocessor interface 96 through an internal multiplexer (not shown) for communicating with the program counter 124 which sends stepping instructions to the ROM based sequencer 122. The multiplexer circuit is also used to send out requests from the sequencer 122 internally within the processor 98.

The algorithm for the control loops shown in FIG. 5 may be downloaded from the microprocessor at initialization and are stored in the memory circuits 112. Alternatively, the algorithm could be stored in ROM memory in the processor 98. The microprocessor also downloads necessary constants required by the voltage regulator for implementing the algorithm, such as gain and compensation filter constants.

The ALU 116 is used to perform fixed point multiplication, addition, subtraction, etc. It sends out flags as necessary to the ROM based sequencer 122 and communicates through the multiplexer. The memory circuits are divided into a first section of RAM 128 containing variables generated by the voltage regulator processor 98 and a second section of RAM 130 for storing constants.

The ACC sequencer circuit 100 is used to provide an interface to the analog control circuit 64, see FIG. 5, and performs the functions described above relative to the data acquisition interface 68. Specifically, the ACC sequencer circuit 100 is a ten-bit interface which communicates with a ten-bit analog/digital (A/D) converter and a multiplexer consisting of twelve channels, of the analog control circuit 64. The sequencer circuit 100 receives end of conversion and ten-bit data lines and provides multiplexer address and strobe control signals to control the analog control circuit A/D converter.

With reference also to FIG. 8, the load division circuit 102 is connected to the data bus 108 and the address bus 110 and is a peripheral circuit which is free running and generates a completion flag to update information. The load division circuit 102 is used in multi-channel operation and operates to divide the load equally between multiple generators, as discussed above.

The load division circuit 102 receives the POR voltage waveform signal at a block 132 and a signal representing the difference from average current waveform at a block 134. Specifically, these signals represent the square wave signals discussed above relative to FIG. 5. A phase difference control 136 comprising a programmable logic array operates in connection with a phase and frequency counter circuit 138 to determine the phase difference or phase angle between the two waveforms. A ROM lookup table 140 determines the sine and cosine of the phase angle to determine real and reactive components of the power for use in the load division loops 84 and 86, as discussed above relative to FIG. 5.

The PMG and MPU frequency sense circuit is a peripheral circuit free running and generates a completion flag to update new cycle information. Specifically, this circuit 104 is used to enable or disable the output driver of the PWM circuit 106 to the exciter field via magnetic pickup ready speed or PMG under frequency.

The PWM circuit 106 provides a controlling output to the exciter field switching circuit 82, see FIG. 5, for regulation of the system voltage. It accepts the calculated input from the voltage regulator control loops which determine the characteristics of the square wave output.

In operation, as discussed above, the voltage regulator circuit sequencer implements the average voltage loop during each cycle of operation to update the square wave output and biases the average voltage loop error in accordance with the real and reactive components of the difference from average current to compensate for imbalances in load sharing.

Thus, in accordance with the above, a generator control unit for an electrical power generating system is provided with a voltage regulator including real and reactive load division.

I claim:

1. In a multi-channel generating system, each channel having a main generator and an exciter providing field current to the main generator, a generator control for each channel comprising:
    voltage sensing means for sensing generator output voltage;
    voltage reference means for developing a setpoint representing a desired generator output voltage;
    voltage control means responsive to said voltage sensing means and said voltage reference means for developing a controlling output to the exciter to regulate the output of the main generator;
    current sensing means for sensing generator output current for the particular channel relative to the other channels;
    load division means responsive to said current sensing means and said voltage sensing means for determining real and reactive components of generator output power; and
    means coupled to said load division means and operatively associated with said voltage control means for modifying the controlling output to the exciter responsive to both said real and reactive components of generator output power to divide loading equally between each channel.

2. The generator control of claim 1 wherein the current sensing means includes means for sensing difference between generator output current for the particular channel relative to average generator output current per channel.

3. The generator control of claim 1 wherein said load division means senses a phase difference between said generator output current and said generator output voltage.

4. The generator control of claim 3 wherein said load division means includes means for determining said real component responsive to cosine of said phase difference and means for determining said reactive component responsive to sine of said phase difference.

5. The generator control of claim 1 wherein said modifying means includes means for limiting an amount which said controlling output is modified.

6. In a multi-channel generating system, each channel having generator including a main generator which develops output power, an exciter providing field current to a field winding of the main generator, and a permanent magnet generator for providing field current to a field winding of the exciter, said exciter field current being controlled in accordance with a control signal which controls the exciter to regulate the output of the main generator, a generator control unit for each channel comprising:
    voltage sensing means for sensing generator output voltage;
    current sensing means for sensing generator output current for the particular channel relative to the other channels;
    a processor responsive to said sensed voltage for establishing the control signal in accordance with a programmed control algorithm and including a load division algorithm responsive to said sensed current for modifying the control signal in accordance with both real and reactive components of sensed current to divide load between each generator; and
    a programmable memory connected with said processor and storing data used by said load division algorithm to determine said real and reactive components.

7. The generator control of claim 6 wherein the current sensing means includes means for sensing difference between generator output current for the particular channel relative to average generator output current per channel.

8. The generator control of claim 6 wherein said load division algorithm includes means for determining a phase difference between said generator output current and said generator output voltage.

9. The generator control of claim 8 wherein said determining means includes means for determining said real component responsive to cosine of said phase difference and means for determining said reactive component responsive to sine of said phase difference in accordance with a lookup table stored in said memory circuit.

10. The generator control of claim 6 wherein said load division algorithm includes means for limiting an amount which said controlling output is modified.

11. The generator control of claim 10 wherein said limiting means comprises real and reactive programmed limit curves represented by data stored in said memory.

12. In a generator control for a select channel of a multi-channel generating system, each channel having a main generator, an exciter providing field current to the main generator, and a voltage control developing a controlling output to the exciter to regulate the output voltage of the main generator, a load division control comprising:
    a current sensor sensing difference between generator output current for the particular channel relative to average current per channel;
    a load division means responsive to said current difference and generator output voltage for determining real and reactive components of a difference between generator load for the particular channel relative to average generator load; and
    means coupled to said voltage control and said load division means for modifying said controlling output responsive to both said real and reactive components at generator output power to divide loading equally between each generator.

13. The load division control of claim 12 wherein said load division means senses a phase difference between said current difference and said generator output voltage.

14. The load division control of claim 13 wherein said load division sensor includes means for determining said real component responsive to cosine of said phase difference and means for determining said reactive component responsive to sine of said phase difference.

15. The load division control of claim 12 wherein said modifying means includes means for limiting an amount which said controlling output is modified.

16. The load division control of claim 12 wherein said current sensor comprises a current transformer loop having a plurality of series connected current transformers each sensing output current from its associated generator.

* * * * *